United States Patent Office 3,101,359
Patented Aug. 20, 1963

3,101,359
PROCESS FOR PREPARING 16α-METHYL-5β-ANDROSTANE-3,11,17-TRIONE AND NOVEL INTERMEDIATE THEREIN
Georges Muller, Nogent-sur-Marne, and Jacques Martel, Bondy, France, assignors, by mesne assignments, to Roussel-UCLAF, S.A., Paris, France, a corporation of France
No Drawing. Filed Feb. 1, 1961, Ser. No. 86,320
Claims priority, application France Feb. 9, 1960
3 Claims. (Cl. 260—397.45)

This invention relates to novel keto-steroids of the 5β-androstane series and more particularly to 16α-methyl-5β-androstane - 3,11,17 - trione. The invention further relates to processes for the preparation of the novel steroids and novel intermediates therefor.

16α-methyl-5β-androstane-3,11,17-trione exercises an inhibiting activity on hypophysis and is also an intermediate in the synthesis of steroids and particularly for the production of 9α-fluoro-17-[(β-hydroxy)-ethylimino]-16α-methyl-Δ$^{1,4}$-androstadiene-11β-ol-3-one.

It is an object of the invention to obtain 16α-methyl-5β-androstane-3,11,17-trione.

It is another object of the invention to provide a process for the preparation of 16α-methyl-5β-androstane-3,11,17-trione starting from 3α - acetoxy-16α-methyl-5β-pregnane-20β-ol-11-one.

It is another object of the invention to provide a process for the preparation of 16α-methyl-5β-androstane-3,11,17-trione starting from 3α-acetoxy-16α-methyl-5β-pregnane-11,20-dione.

It is a further object of the invention to provide a process for the preparation of 16α-methyl-5β-androstane-3,11,17-trione starting from 21-acetoxy - 16α - methyl-5β-pregnane-3α,17α-diol-11,20-dione.

It is an additional object of the invention to obtain the novel intermediate, 16α-methyl - 5β - androstane-3α,17β-diol-11-one.

These and other objects and advantages of the invention will become obvious from the following detailed description.

One process of the invention comprises the degradation of the lateral chain of a 3-acyl ester of 3α-hydroxy-16α-methyl-5β-pregnane-20β-ol-11-one (II) such as the 3α-acetoxy ester and subsequent saponification to form 16α-methyl-5β-androstane-3α,17β-diol-11-one (III) and oxidizing the latter to form 16α-methyl-5β-androstane-3,11,17-trione. The degradation can be effected by oxidation and, in particular, it is effected by the lead tetraacetate in an organic solvent such as benzene while operating at elevated temperatures and in the presence of white light. The saponification is preferably effected at elevated temperatures with an aqueous alkanolic solution of alkali metal hydroxide such as a mixture of methanol and aqueous sodium hydroxide. The final oxidation step of oxidizing the hydroxy groups in the 3- and 17-positions to keto groups is preferably effected with an oxidizing agent such as a solution of chromic acid in acetic acid.

Another process of the invention comprises degradation of the lateral chain of an acyl ester of 3α-hydroxy-16α-methyl-5β-pregnane-11,20-dione (IV) such as the 3α-acetoxy ester to form the corresponding 3α-acyloxy-17β-acyloxy-16α-methyl - 5β - androstane-11-one (IIIa), saponifying the said ester compound to form 16α-methyl-5β-androstane-3α,17β-diol-11-one (III) which is oxidized to give 16α-methyl-5β-androstane - 3,11,17 - trione. The degradation of the lateral chain is preferably effected with a percarboxylic acid such as perphthalic acid followed by saponification with an alkaline aqueous alkanolic solution such as a mixture of methanol and aqueous sodium hydroxide. The oxidation step may be effected with an oxidizing agent such as a solution of chromic acid in acetic acid.

Another process of the invention is the degradation of the lateral chain of a 21-acyl ester of 21-hydroxy-16α-methyl - 5β - pregnane - 3α,17α - diol - 11,20 - dione (V) such as the 21-acetoxy ester to form 16α-methyl-5β-androstane-3α-ol-11,17-dione (VI) which is oxidized to form 16α-methyl-5β - androstane-3,11,17-trione. The degradation of the lateral chain is preferably carried out in the presence of an alkali metal bismuthate, such as sodium bismuthate and the oxidation is effected with an oxidizing agent such as a solution of chromic acid in acetic acid.

The flow diagram of these processes is illustrated in Table I.

TABLE I

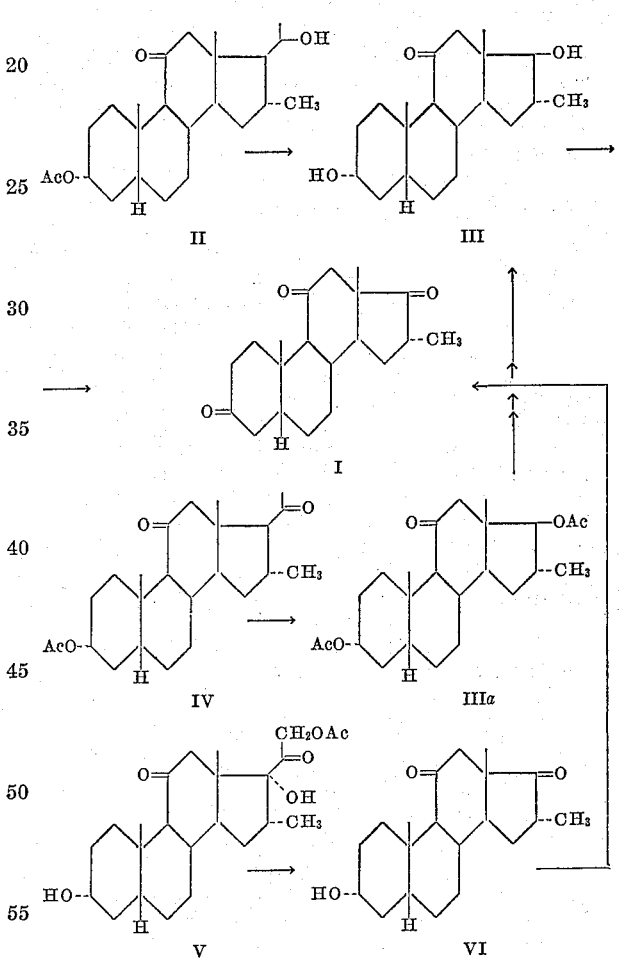

Ac represents the acyl radical of an organic carboxylic acid having from 1 to 18 carbon atoms.

The starting compounds, 3α-acetoxy-16α-methyl-5β-pregnane-11,20-dione and 21-acetoxy-16α-methyl-5β-pregnane-3α,17α-diol-11,20-dione, were prepared according to the method of Arth et al., J. Am. Chem. Soc., vol. 80 (1958), p. 3160. The starting compound, 3α-acetoxy-16α-methyl-5β-pregnane-20β-ol-11-one, was prepared by the reduction of 3α-acetoxy-16α-methyl-5β-pregnane-11,20-dione with an alkali metal borohydride in lower alkanols.

In the following examples there are described several preferred embodiments to illustrate the invention. However, it should be understood that the invention is not intended to be limited to the specific embodiments.

Example 1

PREPARATION OF 16α-METHYL-5β-ANDROSTANE-3,11,17-TRIONE (I)

*Step A: Preparation of 16α-methyl-5β-androstane-3α, 17β-diol-11-one (III).*—60 gm. of 3α-acetoxy-16α-methyl-5β-pregnane-20β-ol-11-one (II) were dissolved in 1.6 liters of benzene and about 200 cc. of benzene were distilled off in order to remove all traces of moisture. 120 gm. of lead tetraacetate were then introduced rapidly. The reaction mixture was maintained at reflux under agitation and irradiation with white light for six hours (the irradiation was effected with a 100 w. lamp at 3 cm. distance). The reaction mixture was then cooled. The excess lead tetraacetate was destroyed by addition of 20 cc. of ethylene glycol.

Then the reaction mixture was washed successively with water, with a saturated sodium bicarbonate solution, and again with water. The benzenic layer was dried over magnesium sulfate and evaporated to dryness. The residue was dissolved in petroleum ether to eliminate the 3α-acetoxy-18,20-oxido-16α-methyl-5β-pregnane-11-one formed. It was then purified by chromatography as has been described by the applicants in their copending application Serial No. 80,558, filed January 4, 1961, now Patent No. 2,984,662.

The mother liquors furnished 16 gm. of resin which were taken up in 150 cc. of methanol and 16 cc. of sodium hydroxide solution. The reaction mixture was then heated to reflux for thirty minutes, then cooled, diluted by 300 cc. of water and extracted with methylene chloride. The organic phase was washed with water until the wash water was neutral, dried and evaporated to dryness. 15.5 gm. of an oil were obtained which was impure 16α-methyl-5β-androstane-3α,17β-diol-11-one.

Purification was effected by chromatography on alumina (washed with acid) in mixed cyclohexane-benzene (2:1) and elution with methylene chloride containing 5% of methanol. 4.27 gm. of 16α-methyl-5β-androstane-3α,17β-diol-11-one were obtained after recrystallization from a mixture of methyl chloride and isopropyl ether with a melting point of 184–186° C. and a specific rotation of $[\alpha]_D^{20} = +46° \pm 1$ (c.=1% in chloroform).

The product was soluble in chloroform, slightly soluble in ether, insoluble in water.

*Analysis.*—$C_{20}H_{23}O_3$; molecular weight=320.46. Calculated: C, 74.96%; H, 10.06%. Found: C, 74.9%; H, 10.0%.

This compound is not described in the literature.

The starting compound II was obtained by the technique described in copending patent application Serial No. 80,558, filed January 4, 1961, now U.S. Patent No. 2,984,662, which consists in selective reduction of the carbonyl group in the 20-position of 3α-acetoxy-16α-methyl-5β-pregnane-11,20-dione giving the 3α-acetoxy-16α-methyl-5β-pregnane-20β-ol-11-one. The reduction was effected by means of sodium borohydride in absolute ethanol.

*Step B: Preparation of 16α-methyl-5β-androstane-3,11, 17-trione (I).*—250 mg. of 16α-methyl-5β-androstane-3α, 17β-diol-11-one were dissolved in 2.5 cc. of acetic acid. 2 cc. of a solution of chromic acid in acetic acid containing 9.85% chromic acid were then introduced for a period of forty minutes under agitation and at room temperature into the reaction mixture. The reaction mixture was allowed to stand for one hour under agitation at room temperature. On addition of 20 cc. of water, 16α-methyl-5β-androstane-3,11,17-trione was precipitated. This compound was extracted with methylene chloride and ethyl ether successively.

The organic layers were washed with water until the wash water was neutral, dried over magnesium sulfate and evaporated to dryness. The oily residue was taken up in ethyl ether and crystallized. The crystals were filtered and washed with isopropyl ether, then triturated with ethyl ether and dried at 80° C.

Purification was effected by dissolution of the raw product in methylene chloride, adding ethyl acetate thereto and concentrating. Recrystallization was effected from ethyl acetate. 65 mg. of 16α-methyl-5β-androstane-3,11, 17-trione were obtained having a melting point of 212° C. This compounds was soluble in chloroform, slightly soluble in ether and ethyl acetate, insoluble in water, and dilute aqueous acids and alkalis.

*Analysis.*—$C_{20}H_{28}O_3$; molecular weight=316.42. Calculated: C, 75.91%; H, 8.92%; O, 15.17%. Found: C, 75.4%; H, 8.8%; O, 16.10%.

This compound is not described in the literature.

Example 2

*Step A.*—1.4 gm. of 3α-acetoxy-16α-methyl-5β-pregnane-11,20-dione (IV) were mixed with 17 cc. of perphthalic acid of 50% concentration in ether. The mixture was agitated at 15° C. for 140 hours, then poured under agitation into 140 cc. of water containing 15 cc. of concentrated ammonia.

The mixture was extracted with methylene chloride, washed with ammonia, then with water. The organic phase was dried over magnesium sulfate and distilled to dryness. The residual resin weighs 1.2 gm. It contained 3α, 17β-diacetoxy-16α-methyl-5β-androstane-11-one and the starting material, both saponified in part.

*Step B: Treatment by the Girard reagent T.*—1.2 gm. of the resin from the preceding stage was dissolved in 12 cc. of absolute ethanol and to the solution was added 1.2 cc. of acetic acid and 1.2 gm. of Girard's reagent T. After isolating the non-ketonic steroid by the usual treatments, about 1 gm. of 3α,17β-diacetoxy-16α-methyl-5β-androstane-11-one was obtained of which a small fraction was saponified either in the $C_3$-position or the $C_{17}$-position. Total saponification was achieved by solution of the compound in 10 cc. of methanol and 1 cc. of sodium hydroxide solution, heating to reflux for thirty minutes. The mixture was added to water and extracted with methylene chloride. The raw resin, after distillation of the organic solvent, was treated according to Example 1 in order to give 16α-methyl-5β-androstane-3α,17β-diol-11-one.

Example 3

2.1 gm. of 21-acetoxy-16α-methyl-5β-pregnane-3α,17α-diol-11,20-dione, V, and 42 cc. of acetic acid were mixed. 42 cc. of water and 4.2 gm. of sodium bismuthate were added and the mixture was agitated for 140 hours at 20° C. Thereafter, the mixture was added to ice and ammonia was added until the pH reached 4.5. The mixture was extracted with methylene chloride, washed with water, dried and distilled to dryness. The raw residue weighed 3.0 gm. It was the 16α-methyl-5β-androstane-3α-ol-11,17-dione, which was oxidized according to Example 1B with chromic acid in order to obtain 16α-methyl-5β-androstane-3,11,17-trione.

16α-methyl-5β-androstane-3,11,17-trione can be brominated with N-bromosuccinimide to give the corresponding 4-bromo compound which can be dehydrobrominated in the presence of a mixed lithium carbonate-lithium bromide salt to give the corresponding 16α-methyl-Δ⁴-androstene-3,11,17-trione. This latter compound can serve as an intermediate in the synthesis of other steroid compounds such as 9α-fluoro-17-[(β-hydroxy)-ethylimino]-16α-methyl-Δ¹,⁴-androstadiene-11β-ol-3-one.

Various modifications of the process of the present invention may be made without departing from the scope or spirit thereof, and it is to be understood that the invention be limited only as defined in the appended claims.

We claim:

1. 16α-methyl-5β-androstane-3α,17β-diol-11-one.

2. A process for the preparation of 16α-methyl-5β-androstane-3,11,17-trione which comprises degrading the lateral side claim of 3α-acetoxy-16α-methyl-5β-pregnane-20β-ol-11-one with lead tetraacetate in the presence of white light and saponifying the product with an alkali metal hydroxide to form 16α-methyl-5β-androstane-3α,17β-diol-11-one, oxidizing the latter with chromic acid to form 16α-methyl-5β-androstane-3,11,17-trione and recovering the latter.

3. The process of claim 2 wherein the saponification is effected with a mixture of aqueous sodium hydroxide and methanol.

References Cited in the file of this patent

UNITED STATES PATENTS 2,940,991      Julian et al. _____ Mar. 1, 1957

OTHER REFERENCES

Wendler et al.: Tetrahedron (1959) 7, 173–184.
Bernstein et al.: Chem. and Industry, Feb. 4, 1956, pp. 111–112.
Robinson et al.: J.A.C.S. 81, 2191–2195 (1959).
Fieser et al.: Natural Products Related to Phenanthrene, third edition (1949), p. 402.